US012305424B2

(12) United States Patent
Judah et al.

(10) Patent No.: US 12,305,424 B2
(45) Date of Patent: May 20, 2025

(54) ELECTRONIC LOCK

(71) Applicant: SOUTHCO, INC., Concordville, PA (US)

(72) Inventors: David Gray Judah, Philadelphia, PA (US); Christopher Todd Gahring, Wynnewood, PA (US)

(73) Assignee: Southco, Inc., Concordville, PA (US)

( * ) Notice: Subject to any disclaimer, the term of this patent is extended or adjusted under 35 U.S.C. 154(b) by 622 days.

(21) Appl. No.: 17/429,195

(22) PCT Filed: Jan. 8, 2020

(86) PCT No.: PCT/US2020/012699
§ 371 (c)(1),
(2) Date: Aug. 6, 2021

(87) PCT Pub. No.: WO2020/163034
PCT Pub. Date: Aug. 13, 2020

(65) Prior Publication Data
US 2022/0136285 A1 May 5, 2022

Related U.S. Application Data

(60) Provisional application No. 62/803,016, filed on Feb. 8, 2019.

(51) Int. Cl.
*E05B 47/00* (2006.01)
*E05B 1/00* (2006.01)
(Continued)

(52) U.S. Cl.
CPC ........ *E05B 47/0012* (2013.01); *E05B 1/0038* (2013.01); *E05B 83/28* (2013.01);
(Continued)

(58) Field of Classification Search
CPC ........ E05B 1/0038; E05B 83/34; E05B 83/28; E05B 83/30; E05B 83/32; E05B 13/002;
(Continued)

(56) References Cited

U.S. PATENT DOCUMENTS 6,619,085 B1 * 9/2003 Hsieh .................... E05B 47/026 292/144
7,004,517 B2 2/2006 Vitry et al.
(Continued)

FOREIGN PATENT DOCUMENTS

CN 102261202 A 11/2011
CN 206917434 U * 1/2018
(Continued)

OTHER PUBLICATIONS

Espacenet, machine translation of FR 3001489 A1, generated Feb. 9, 2024. (Year: 2024).*
(Continued)

*Primary Examiner* — Eugene G Byrd
*Assistant Examiner* — Emily G. Brown
(74) *Attorney, Agent, or Firm* — Buchanan Ingersoll & Rooney PC

(57) ABSTRACT

An electronic lock for securing a door or access panel. The electronic lock includes a housing and a plunger that is moveably mounted to the housing between a latched position of the electronic lock and an unlatched position of the electronic lock. A rotator is rotatably mounted to the housing between an unlocked position and a locked position. In the locked position of the rotator, the plunger is prevented from moving to the unlatched position, and, in the unlocked position of the rotator, the plunger is permitted to move to the unlatched position. A motor has an output shaft that is configured to rotate the rotator between the locked position and the unlocked position. A spring is configured to resist
(Continued)

movement of the output shaft between the locked position and the unlocked position.

15 Claims, 17 Drawing Sheets

(51) Int. Cl.
*E05B 15/04* (2006.01)
*E05B 83/28* (2014.01)

(52) U.S. Cl.
CPC ... *E05B 2015/041* (2013.01); *E05B 2047/002* (2013.01); *E05B 2047/0037* (2013.01); *E05B 2047/0052* (2013.01)

(58) Field of Classification Search
CPC ............... E05B 13/105; E05B 47/0012; E05B 2047/002; E05B 2047/0037; E05B 2047/0052; E05B 2015/041; E05B 67/28; E05B 2015/0468
See application file for complete search history.

(56) References Cited

U.S. PATENT DOCUMENTS

| | | | | |
|---|---|---|---|---|
| 7,455,335 | B2 * | 11/2008 | Garneau | E05B 63/0065 292/144 |
| 10,081,970 | B2 | 9/2018 | Aselage et al. | |
| 10,753,125 | B2 * | 8/2020 | Ogden | E05B 47/0607 |
| 2009/0173594 | A1 | 7/2009 | Joshi et al. | |
| 2010/0000273 | A1 * | 1/2010 | Viso Cabrera | G07C 9/00944 70/277 |
| 2010/0223968 | A1 * | 9/2010 | Krueger | E05B 81/06 70/283.1 |
| 2011/0169291 | A1 | 7/2011 | Siethorst et al. | |
| 2014/0042766 | A1 * | 2/2014 | Meyer | B60R 25/24 296/37.1 |
| 2015/0068257 | A1 * | 3/2015 | Ogden | E05B 47/0607 70/264 |
| 2018/0195321 | A1 * | 7/2018 | Zhang | E05B 81/14 |
| 2020/0040609 | A1 * | 2/2020 | Alexander | E05B 81/04 |

FOREIGN PATENT DOCUMENTS

| | | | | |
|---|---|---|---|---|
| DE | 102004015068 | A1 * | 10/2005 | B60R 7/06 |
| EP | 1310424 | A1 | 5/2003 | |
| FR | 3001489 | A1 * | 8/2014 | E05B 83/34 |
| KR | 20100012927 | U | 12/2010 | |

OTHER PUBLICATIONS

Espacenet, machine translation of CN 206917434 U, generated Feb. 9, 2024. (Year: 2024).*
Machine generated translation of CN 206917434 U (Year: 2024).*
International Search Report and Written Opinion for International Application No. PCT/US2020/012699, dated Jun. 23, 2020, 19 pages.
International Preliminary Report on Patentability and Written Opinion for International Application No. PCT/US2020/012699, issued Aug. 10, 2021, 15 pages.
Chinese Office Action for Chinese Application No. 202080027258.4, dated Jun. 27, 2022, with translation, 28 pages.

* cited by examiner

ELECTRONIC LOCK

CROSS REFERENCE TO RELATED APPLICATIONS

This application is a U.S. national phase application filed under 35 U.S.C. § 371 claiming benefit to International Patent Application No. PCT/US2020/012699. fled 8 Jan. 2020, which is related to, and claims the benefit of priority from, U.S. Provisional Application No. 62/803,016, titled ELECTRONIC LOCK, filed 8 Feb. 2019, the contents of which are incorporated herein by reference in their entirety for all purposes.

FIELD OF THE INVENTION

The present invention relates to the field of locks or connector systems configured to provide a mechanical connection between adjacent components, and particularly to locking systems for securing automotive glove box or accessory compartment doors in the closed position.

BACKGROUND OF THE INVENTION

Automotive door closure systems, such as glove boxes and the like, typically include a door housing mounted to a dashboard of the vehicle, a door movably mounted to the door housing, and a lockable latch that cooperates with one or more strikers to hold the door in the closed position to cover the door housing. It has been found that there is a continuing need to improve upon or provide alternatives to existing door closure systems.

SUMMARY OF THE INVENTION

According to a first aspect of the present invention, a motor assembly comprises a motor having an output shaft that is configured to be moved between a first position and a second position. A spring that is either directly or indirectly coupled to the output shaft and is configured to resist movement of the output shaft between the first position and the second position.

According to another aspect of the present invention, an electronic lock includes a housing that is configured to be connected to a door housing or a door attached to the door housing. A plunger is moveably mounted to the housing, wherein the plunger is movable between a first position corresponding to a latched state of the electronic lock and a second position corresponding to an unlatched state of the electronic lock. A rotator is rotatably mounted to the housing between a first rotational position and a second rotational position. In the first rotational position of the rotator corresponding to a locked state of the electronic lock, the plunger is prevented from moving from the first position to the second position. In the second rotational position of the rotator corresponding to an unlocked state of the electronic lock, the plunger is permitted to move from the first position to the second position for unlatching the door. A motor having an output shaft is configured to rotate the rotator between the first rotational position and the second rotational position. A spring is configured to resist movement of the output shaft and the rotator between the first rotational position and the second rotational position.

According to yet another aspect of the present invention, a method is provided for operating a motor having an output shaft that is configured to be moved between a first position and a second position. The method comprises the steps of:

operating the motor to move the output shaft between the first position and the second position, thereby compressing a spring that is configured to resist movement of the output shaft between the first position and the second position;

monitoring a current drawn by the motor during the operating step; and stopping the motor when the current drawn by the motor reaches a pre-determined percentage of a stall current of the motor.

According to still another aspect of the invention, a door or access panel assembly comprises a door or access panel; an electronic lock associated with the door or access panel, the electronic lock having a housing; a plunger that is mounted for movement relative to the housing, wherein the plunger is movable between a first position corresponding to a latched state of the electronic lock and a second position corresponding to an unlatched state of the electronic lock; a rotator that is coupled to the plunger and mounted for rotation relative to the housing between a first rotational position and a second rotational position, wherein in the first rotational position of the rotator corresponding to a locked state of the electronic lock, the plunger is prevented from moving from the first position to the second position, and, in the second rotational position of the rotator corresponding to an unlocked state of the electronic lock, the plunger is permitted to move from the first position to the second position for unlatching the door or access panel; a motor having an output shaft that is mounted in the housing and configured to rotate the rotator between the first rotational position and the second rotational position; and a spring that is directly or indirectly coupled to the shaft of the motor and configured to resist the movement of the output shaft and the rotator between the first rotational position and the second rotational position. Movement of the door or access panel is prevented when the plunger is in the first position corresponding to the latched state of the electronic lock and the rotator is in the first rotational position corresponding to the locked state of the electronic lock.

According to yet another aspect of the invention, an electronic lock for securing a door or access panel includes a housing; a plunger that is mounted for movement relative to the housing, wherein the plunger is movable between a first position corresponding to a latched state of the electronic lock and a second position corresponding to an unlatched state of the electronic lock; a slide that is mounted for movement relative to the housing and coupled to the plunger such that movement of the plunger from the first position to the second position causes movement of the slide between latched and unlatched positions; a blocking member that is coupled to the plunger and mounted for movement relative to the housing between a first state and a second state, wherein in the first state of the blocking member corresponding to a locked state of the electronic lock, the plunger is prevented from moving from the first position to the second position, and, in the second state of the blocking member corresponding to an unlocked state of the electronic lock, the plunger is permitted to move from the first position to the second position for unlatching the door or access panel; and an inertial locking system that is configured to prevent the slide from inadvertently moving to the unlatched position during an impact of the door or access panel.

BRIEF DESCRIPTION OF THE DRAWINGS

The above and other aspects and features of the present invention will become more apparent to those of ordinary skill in the art by describing in detail exemplary embodiments thereof with reference to the attached drawings.

DETAILED DESCRIPTION OF THE INVENTION

Figure 1:
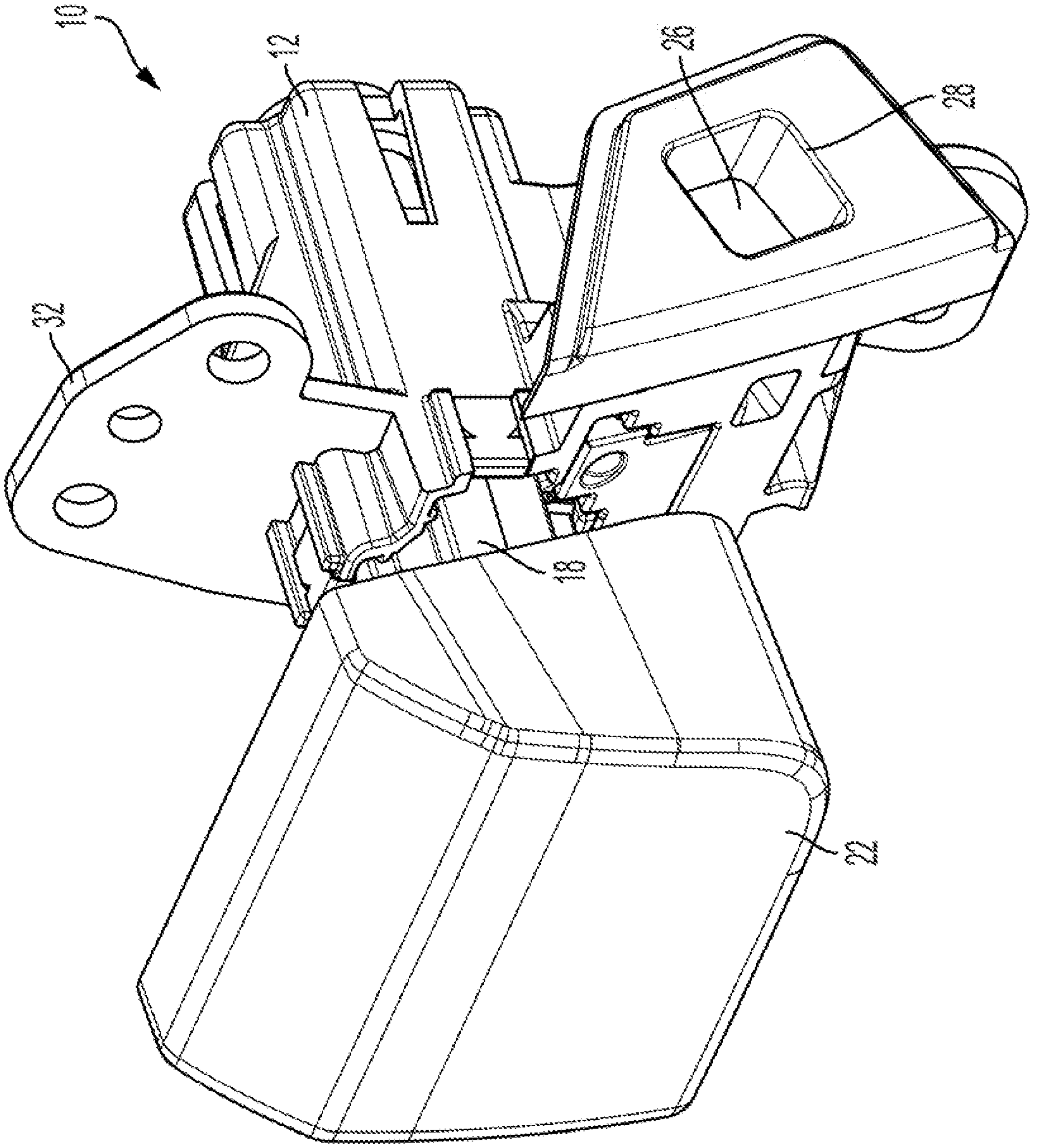
FIG. 1 is an isometric view of an electronic lock.

Although the invention is illustrated and described herein with reference to specific embodiments, the invention is not intended to be limited to the details shown. Rather, various modifications may be made in the details within the scope and range of equivalents of the claims and without departing from the invention.

Various terms are used throughout the disclosure to describe the physical shape or arrangement of features. A number of these terms are used to describe features that conform to a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to a center axis. The terms "radial" and "radially" refer to a direction, dimension or orientation that is perpendicular to the center axis. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Terms concerning attachments, coupling and the like, such as "mounted," "connected" and "interconnected," refer to a relationship wherein structures are secured or attached to one another either directly or indirectly through intervening structures, as well as both movable or rigid attachments or relationships, unless expressly described otherwise.

Figure 2A:
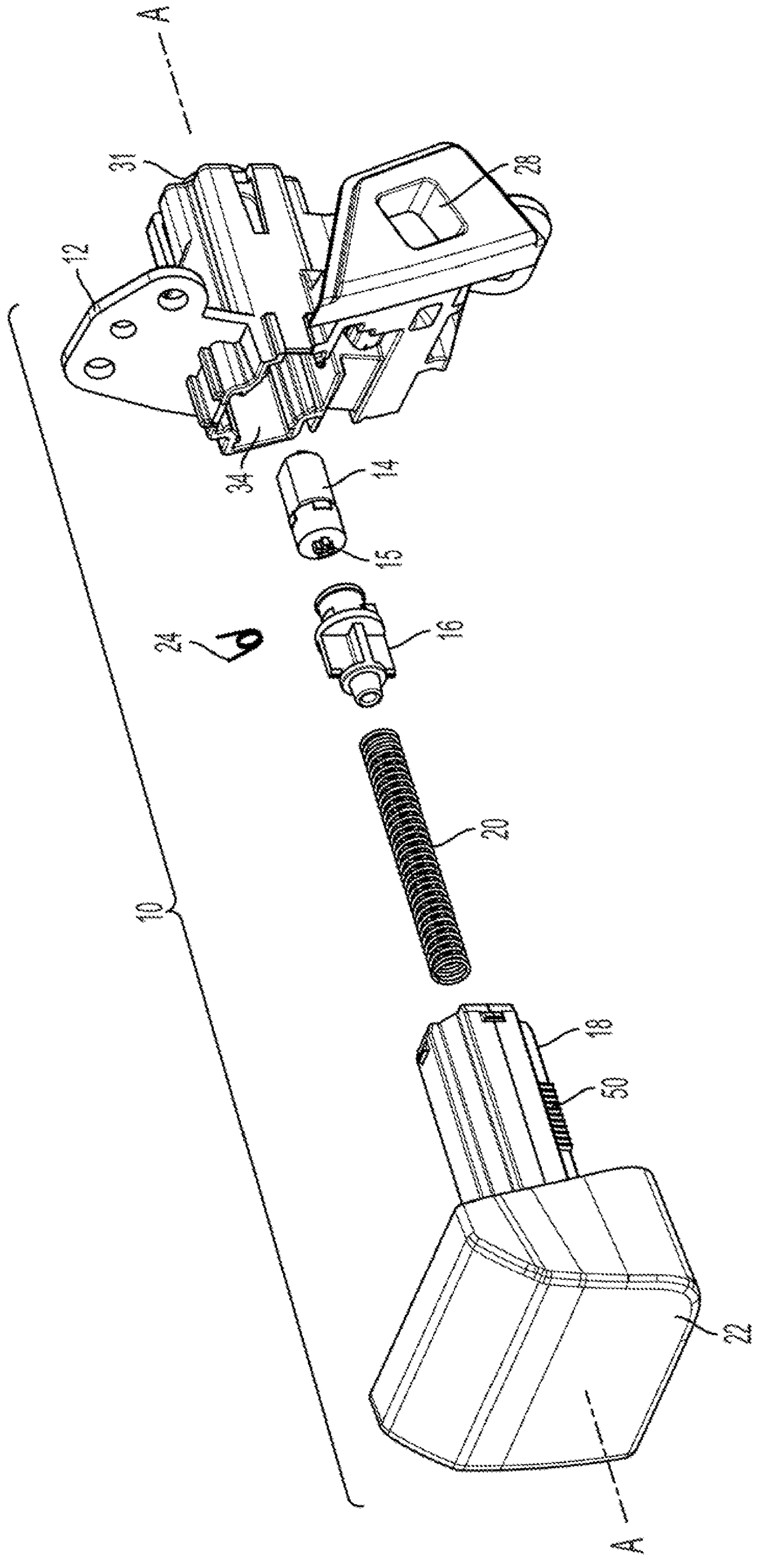
FIG. 2A is an exploded view of the lock, with various features omitted.
Figure 2B:
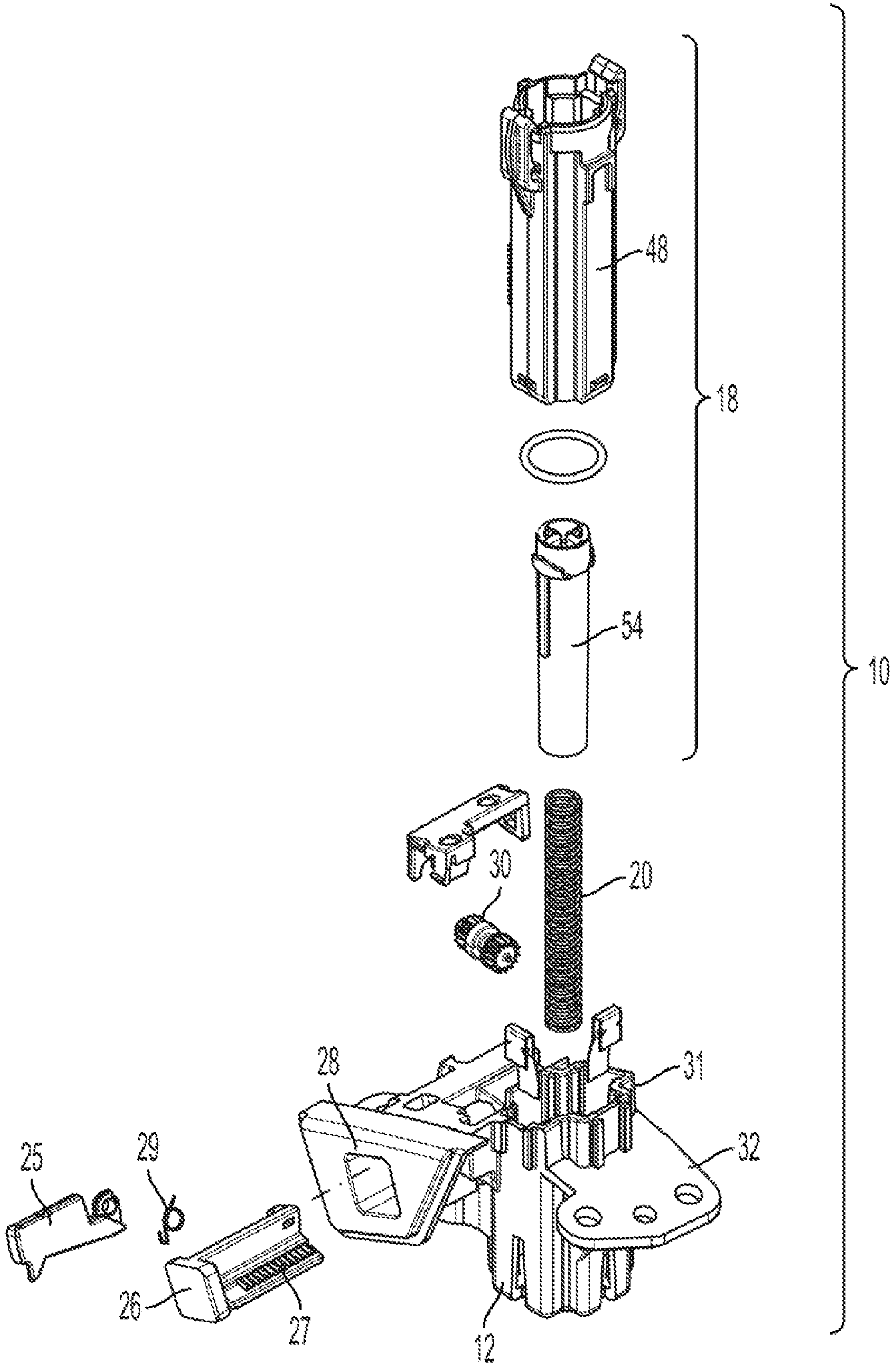
FIG. 2B is another exploded view of the lock, wherein the button is omitted.

FIGS. 1-2B depict an electronic lock 10 according to one exemplary embodiment of the invention. The lock 10 is configured to be mounted to a door housing to which a door is movably mounted. Alternatively, the lock 10 could be configured to be mounted to the door itself. The door could be a door of a motor vehicle, for example, such as a glove box door, a center console door, or any other door covering a compartment in the vehicle. An exemplary glove box door and door housing are shown in U.S. Pat. No. 10,081,970 to Ford and U.S. Pat. No. 7,004,517 to Southco Inc., each of which is incorporated by reference in its entirety and for all purposes. Although not shown herein, the door is mounted over an opening formed in the door housing. The door is hinged to the opening and can move between a latched position and an unlatched position, as is known in the art. The lock 10 is configured to retain the door in a latched position, as well as selectively lock and unlock the door with respect to the door housing. The lock 10 is configured for use with various types of doors, and is not limited for use with vehicle glove boxes.

The lock 10 generally comprises a housing 12 that is configured to be connected to the door housing (for example); a motor and gearbox 14 having an output shaft 15, the body of the motor 14 being fixedly mounted within an interior space of the housing 12; a rotator 16 that is rotatably mounted within the interior space of the housing 12 and is configured to be rotated by the output shaft 15 of the motor 14; a plunger 18 that is translatably mounted within the housing 12 against the bias of a compression spring 20 and extends at least partially outside of the housing 12, whereby the rotator 16 interacts with the plunger 18 to either permit or prevent translation of the plunger 18; a user-accessible button 22 mounted to the free end of the plunger 18; a torsion spring 24 for biasing the rotator 16 away from both the locked and unlocked positions; a bolt, pawl, or slide 26 that is translatably positioned within a recess 28 formed in the housing 12 and has gear teeth 27; an inertial lock 25 that is rotatably coupled to the slide 26 and biased to an unlocked position by a torsion spring 29; and, a gear 30 having teeth that are engaged with the teeth 27 of the slide 26 and teeth 50 on the plunger 18 such that inward translation (i.e., depression) of the plunger 18 causes rotation of the gear 30, which causes translation of the slide 26, which results in unlatching of the door.

Reference is now made to the individual components of the electronic lock 10.

FIGS. 7A-7E depict the housing 12 of the lock 10. The housing 12 is optionally a unitary molded component that may be formed from a polymeric material or a metallic material, for example. The housing 12 includes a body 31 including opposing flanges 32 that are configured to be fixedly mounted to the door housing by fasteners, for example. Thus, the housing 12 is stationary with respect to the door housing. A hollow region 34 is formed in the body 31 for accommodating the motor 14, the rotator 16, and at least a portion of the plunger 18 and the compression spring 20. The perimeter shape of the interior surface of the hollow region 34 substantially matches and compliments the perimeter shape of the exterior surface of the plunger 18 such that plunger 18 is prevented from rotation within the hollow region 34. The aforementioned perimeter shapes are non-circular. In other words, the plunger 18 is keyed to the hollow region 34 of the housing 12. The hollow region 34 extends along a first axis 'A,' which is collinear with the axes of the motor 14, the rotator 16, and the plunger 18. The plunger 18 is configured to translate within the hollow region 34 along axis A.

Figure 7C:
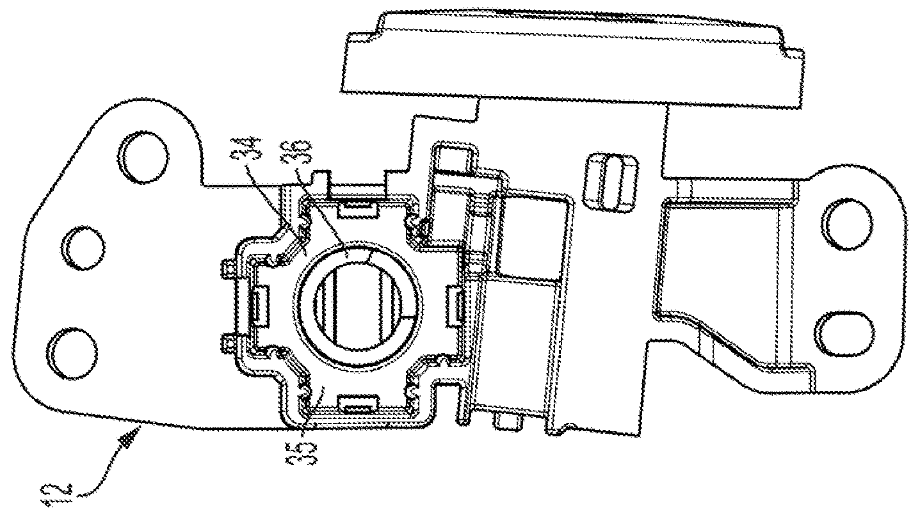
FIG. 7C depicts a front elevation view of the housing.
Figure 7B:
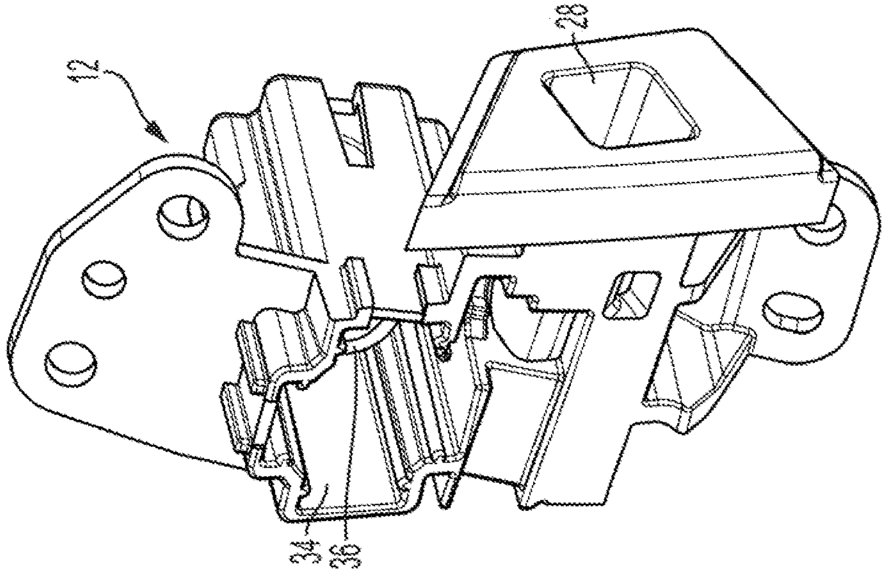
FIGS. 7A and 7B depict isometric views of a housing of the lock.
Figure 7A:
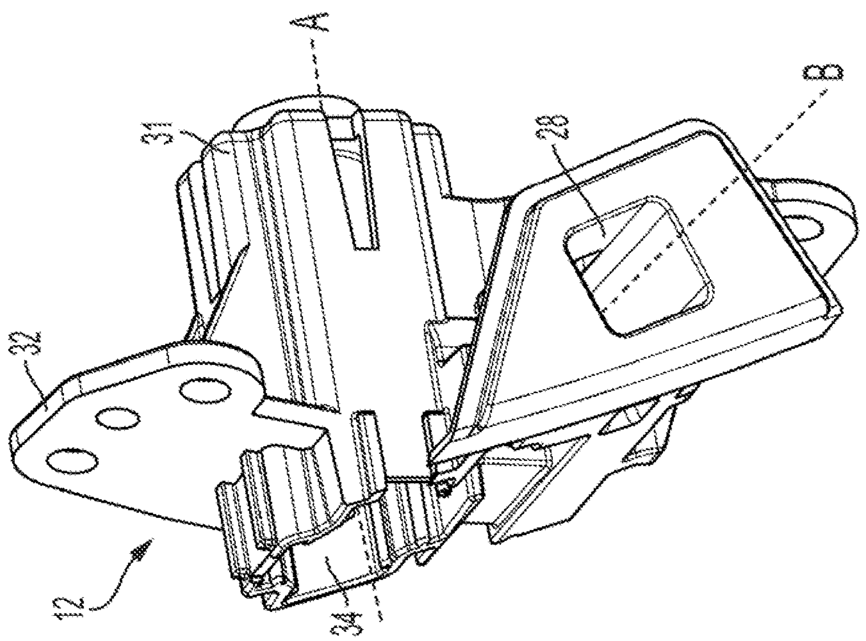
Figure 7E:
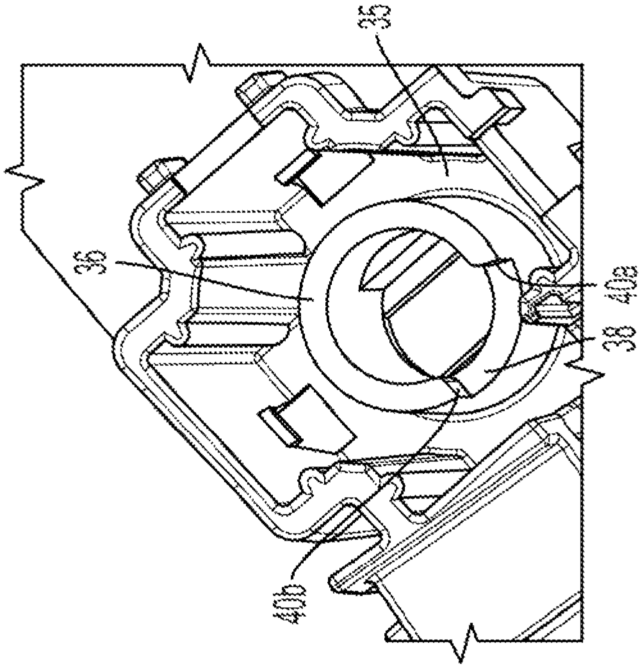
FIG. 7E depicts an isometric view of a hollow mounting portion of the housing that accommodates a motor and interacts with the rotator.
Figure 7D:
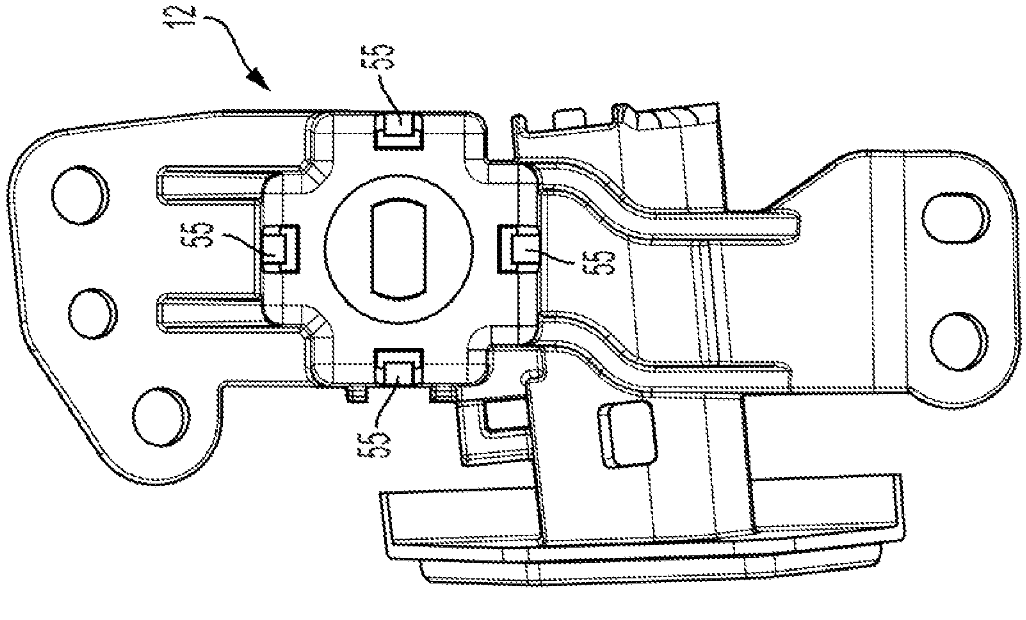
FIG. 7D depicts a rear elevation view of the housing.

As best shown in FIG. 7E, a wall 35 is formed at the base of the hollow region 34. A mounting portion 36 in the form of a hollow cylindrical post extends upwardly from the wall 35 in a direction toward the button 22. A circumferentially extending recess or cutout 38 is formed on a portion of the top edge of the wall 35. Two walls 40*a* and 40*b* are defined at the ends of the cutout 38 and are circumferentially spaced apart from one another. In an assembled form of the lock 10, the motor 14 is positioned within the hollow interior of the mounting portion 36. The base end of the rotator 16 is also positioned within the hollow interior of the mounting portion 36, and, the rotation stop 42 of the rotator 16 is positioned within the space defined between the walls 40*a* and 40*b*. Interaction between the rotation stop 42 (FIG. 9A) of the rotator 16 and the walls 40*a* and 40*b* of the housing 12 restrain rotation of the rotator 16 between two points, which correspond to locked and unlocked states, which will be described in greater detail later.

As best shown in FIG. 7A, the recess 28 is disposed in the housing 12 for accommodating the slide 26. The recess 28 extends along an axis B, which is non-parallel, and, optionally, orthogonal to axis A. The perimeter shape of the recess 28 is the same as and is complimentary to the perimeter shape of the exterior surface of the slide 26. The perimeter shapes are non-circular, and, optionally, rectangular with rounded corners. Due to the geometries of the recess 28 and the slide 26, the slide 26 is capable of translating within the recess 28 along axis B without rotating within the recess 28 about axis B.

FIGS. 8A-8D depict the plunger 18 of the lock 10. The plunger 18 comprises a substantially rectangular body 48. The plunger 18 a unitary molded component, as shown in those figures, which may be formed from a polymeric material or a metallic material, for example. Alternatively, the plunger 18 may be composed of multiple components that are mounted together, as shown in FIG. 2B.

Figure 3C:
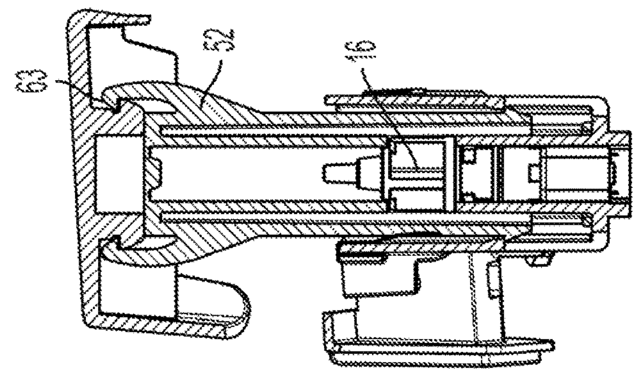
FIGS. 3A-3C depict cross-sectional views of the assembled lock taken from different perspectives, wherein the lock is shown in a locked state.
Figure 8D:
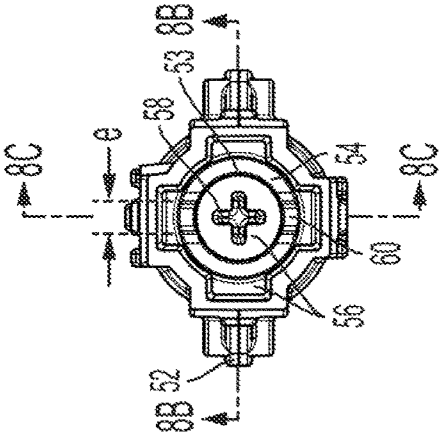
FIG. 8D depicts a bottom plan view of the plunger of FIG. 8A.
Figure 8C:
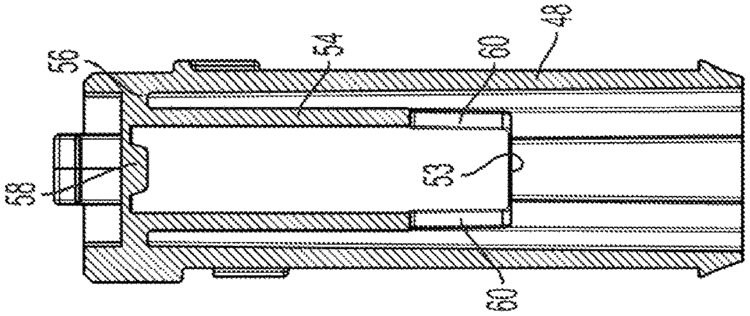
FIG. 8C depicts a cross-sectional view of the plunger of FIG. 8D taken along the lines 8C-8C.
Figure 8B:
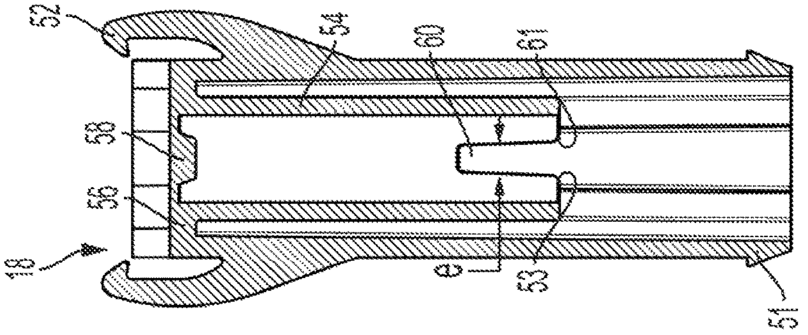
FIG. 8B depicts a cross-sectional view of the plunger of FIG. 8D taken along the lines 8B-8B.
Figure 8A:
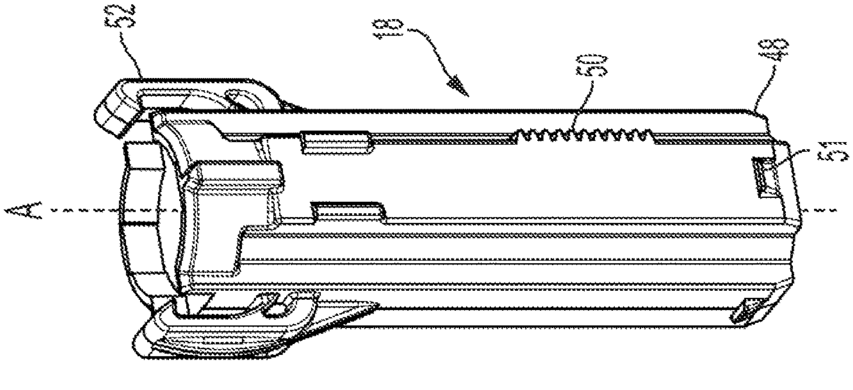
FIG. 8A depicts an isometric view of a plunger of the lock.

The plunger 18 includes a set of teeth 50 on the exterior surface that are spaced apart along the axis A. In an assembled form of the lock 10, the teeth 50 are meshed with the teeth of gear 30 (FIG. 2B). As best shown in FIG. 3C, two clips 52 extend from the top end of the plunger 18 for mating with recesses 63 formed in the underside of the button 22, such that the plunger 18 is fixed to the button 22. As best shown in FIGS. 8B-8D, a hollow tube 54 is disposed within the interior space of the plunger 18 and extends upward from the base wall 56 of the plunger 18 along a substantial proportion of the body 48. The tube 54 may be integral with the body 48 of the plunger 18, as shown in FIGS. 8B-8D, or, alternatively, the tube 54 may be a separate component that is mounted to the body 48, as shown in FIG. 2B. A spring mount 58 in the form of a protrusion extends from the wall 56 in the same direction as the tube 54, and the spring mount 58 is centered within the tube 54. In an assembled form of the lock 10, one end of the spring 20 is mounted on the spring mount 58. The spring mount 58 helps to stabilize the spring 20 in a radial direction during operation of the lock 10. A set of four barbs 51 extend outwardly from the bottom end of the plunger 18 in a radial direction for mating with a surface 55 on the housing 12 to prevent detachment of the plunger 18 from the housing 12.

Two cutouts or recesses 60 are defined on the free end 53 of the tube 54. The recesses 60 are disposed radially opposite one another along the circumference of the tube 54. The recesses 60 extend from the free end 53 of the tube 54 toward the base wall 56 of the plunger 18. Chamfers 61 exist at locations where the edges of each recess 60 meet the free end 53 of the tube 54. Although the plunger 18 is shown and described with two recesses 60, it should be understood that the plunger 18 may have any number of recesses 60. As will be described in greater detail later, the free end 53 and the recesses 60 selectively interact with the rotator 16.

The plunger 18 may assume shapes other than substantially rectangular shape shown so long as the rotator 16 and the plunger 18 can function together to both permit translation of the plunger 18 in the unlocked state of the lock 10 and prevent translation of the plunger 18 in the locked state of the lock 10.

Figure 10:
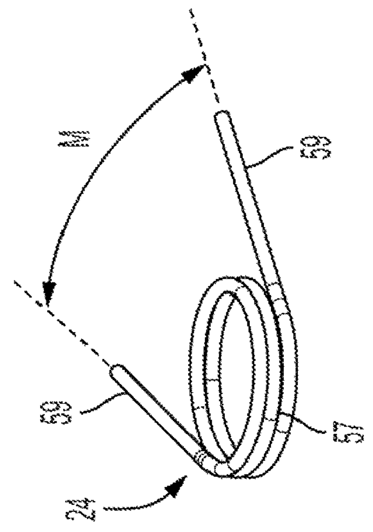
FIG. 10 depicts an isometric view of a torsion spring of the lock.
Figure 12B:
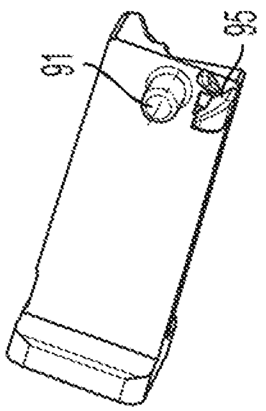
FIGS. 12A-12G depict views of the slide of the lock.
Figure 12D:
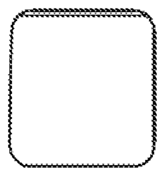
Figure 12A:
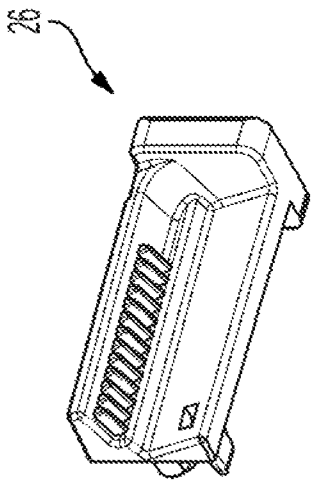
Figure 12C:
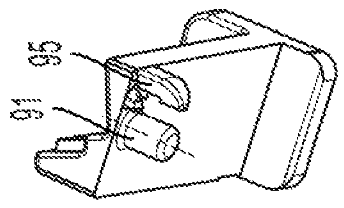
Figure 12F:
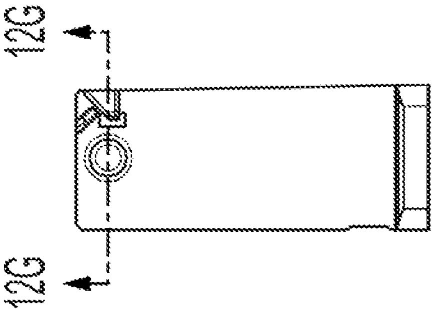
Figure 14:
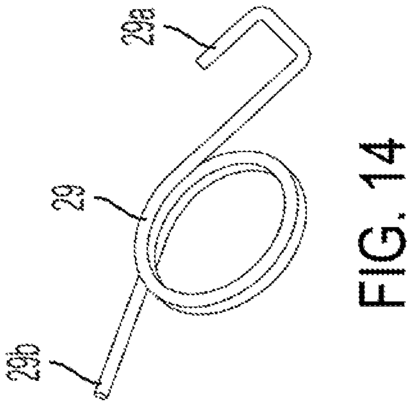
FIG. 14 depicts a torsion spring associated with the inertial lock bar of the lock.
Figure 12E:
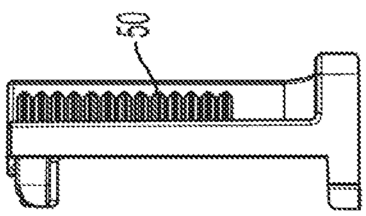
Figure 12G:
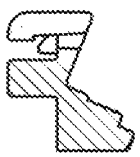
Figure 13A:
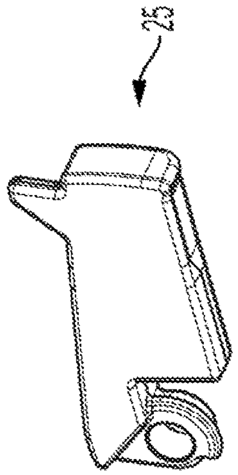
FIGS. 13A-13G depict views of the inertial lock bar of the lock.
Figure 13B:
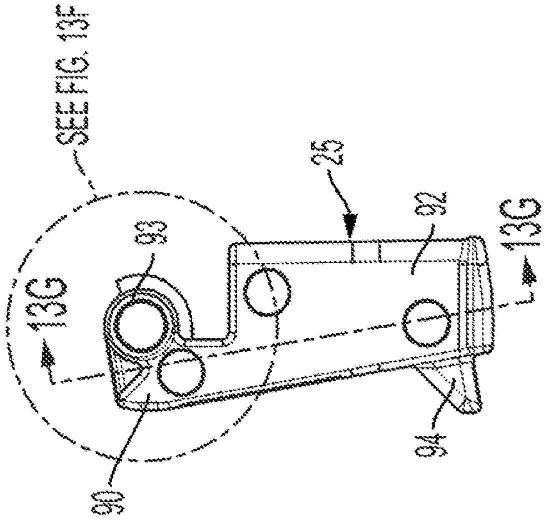
Figure 13C:
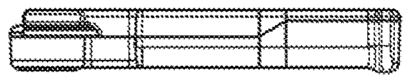
Figure 13D:
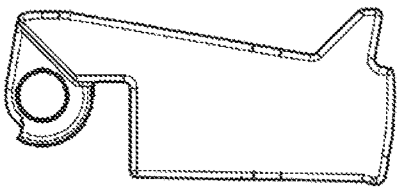
Figure 13G:
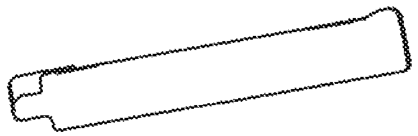
Figure 13F:
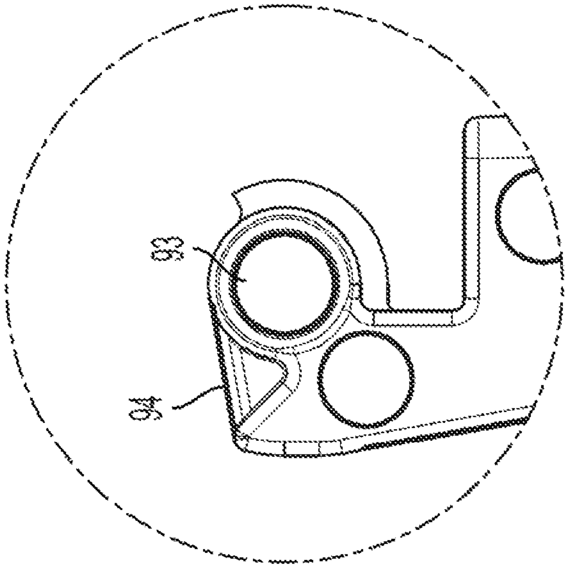
Figure 13E:
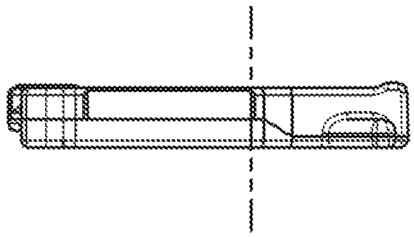

FIG. 10 depicts the coiled torsion spring 24, which includes a coiled portion 57 and two legs 59 that extend from the coiled portion 57. The legs 59 extend from the coiled portion 57 by the same distance (optionally), and are spaced apart by a predetermined angle 'M.' The spring 24 is resiliently deformable, as is known in the art.

Figure 9C:
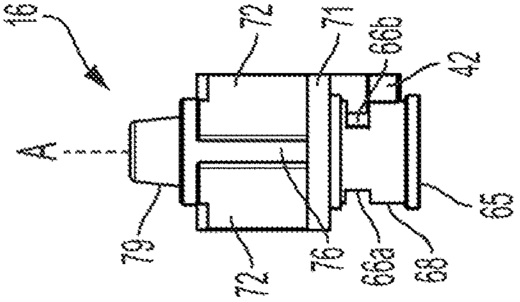
FIG. 9C depicts a front side elevation view of the rotator.
Figure 9F:
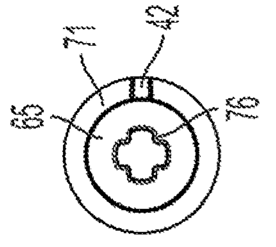
FIG. 9F depicts a bottom plan view of the rotator.
Figure 9B:
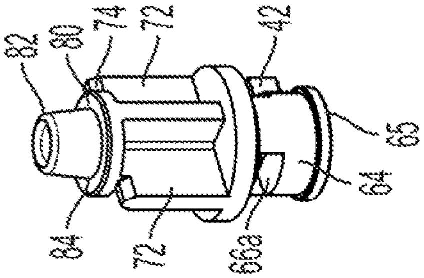
FIGS. 9A and 9B depict isometric views of a rotator of the lock.
Figure 9E:
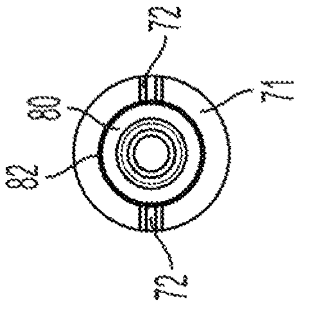
FIG. 9E depicts a top plan view of the rotator.

FIGS. 9A-9F depict the rotator 16 of the lock 10. The rotator 16 may be also referred to herein as a blocking member. The rotator 16 has a substantially cylindrical body 62. The lower portion 64 of the body 62 includes a circular platform 65. The outer diameter of the platform 65 is less than the inner diameter of the mounting portion 36 of the housing 12 such that the lower portion 64 can reside within the inner diameter of the mounting portion 36. As shown in FIG. 9F, a recess 67 is disposed on the bottom end of the platform 65 and is configured for receiving and meshing with the output shaft 15 of the motor 14. The recess is cross-shaped to compliment the geometry of the output shaft 15, however, it will be appreciated that the shape of the recess 67 can vary to suit the geometry of the output shaft 15.

An annular sidewall 68 extends in an axial direction and connects the platform 65 to another platform 71. A rectangular shaped rotation stop 42 extends radially from the sidewall 68 for interacting with the walls 40*a* and 40*b* of the mounting portion 36 of the housing 12. The lower portion 64 has a hollow interior. A first window opening 66*a*, which communicates with the hollow interior of the lower portion 64, is formed on one side of the sidewall 68 of the lower portion 64. Second and third window openings 66*b* and 66*c*, which communicate with the hollow interior of the lower portion 64, are formed on the opposite side of the sidewall 68 of the lower portion 64. The rotation stop 42 intersects and divides the windows 66*b* and 66*c*. In the process of assembling the lock 10, the coiled portion 57 of the spring 24 is positioned through the window 66*a* and is stored within the hollow region of the lower portion 64. The legs 59 of the spring 24 are positioned through the windows 66*b* and 66*c* such that the legs 59 extend outside of the rotator 16 (as best viewed in FIG. 6A).

The central portion 70 of the body 62 of the rotator 16 includes a large diameter circular platform 71. The diameter of the platform 71 is substantially equal to or greater than the outer diameter of the tube 54 of the plunger 18. The underside of the platform 71 rotates on the free end of the mounting portion 36 of the housing 12. The platform 71 approaches, and may bear on, the free end 53 of the tube 54 in an unlocked and unlatched state of the lock 10.

Figure 9A:
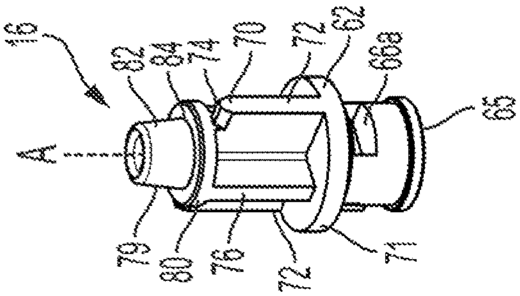
Figure 9D:
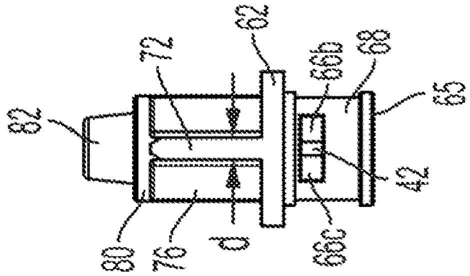
FIG. 9D depicts a right side elevation view of the rotator.

Two alignment ribs 72 extend from the radial center of the body 62 to the outer extent of the platform 71. The ribs 72, which may also be referred to herein as projections, extend in a radial direction by the same distance as the rotation stop 42. In an assembled form of the lock 10, the ribs 72 extend further in the radial direction than the internal diameter of the tube 54. The ribs 72 are positioned radially opposite one another. One of the ribs 72 is radially aligned with the rotation stop 42 along the perimeter of the rotator 16, as best shown in FIG. 9A, such that the outer edge of said one of the ribs 72, the stop 42, and the platform 71 may be flush or substantially flush. The thickness 'd' of each rib 72 is slightly less than the width 'e' of each recess 60 of the plunger 18 such that the ribs 72 can be received in the respective recesses 60. The top end 74 of each rib 72 is chamfered (or rounded) to ease insertion of the ribs 72 into the respective recesses 60, as will be described with reference to operation of the lock 10.

Two structural ribs 76, which are positioned radially opposite one another and perpendicular to the ribs 72, are provided to enhance the structural integrity of the rotator 16. The ribs 76 do not extend as far as the ribs 72 in the radial direction.

The upper end 79 of the body 62 of the rotator 16 includes a small diameter circular platform 80. The structural ribs 76 extend in an axial direction between the platforms 71 and 80. The ribs 76 extend from the radial center of the body 62 to the outer extent of the platform 80. The outer diameter of the platform 80 is less than the inner diameter of the tube 54 such that the upper end 79 of the rotator 16 can reside within inner diameter of the tube 54.

A spring mount 82, in the form of a frustoconical shaped projection, extends above the platform 80. In an assembled form of the lock 10, the lower end of the spring 20 is positioned over the spring mount 82. The spring mount 82 helps to stabilize the spring 20 in a radial direction during operation of the lock 10. The largest diameter of the spring mount 82 is less than the diameter of the platform 80 such that a shoulder 84 is formed therebetween for receiving the lower end of the spring 20.

Figure 3B:
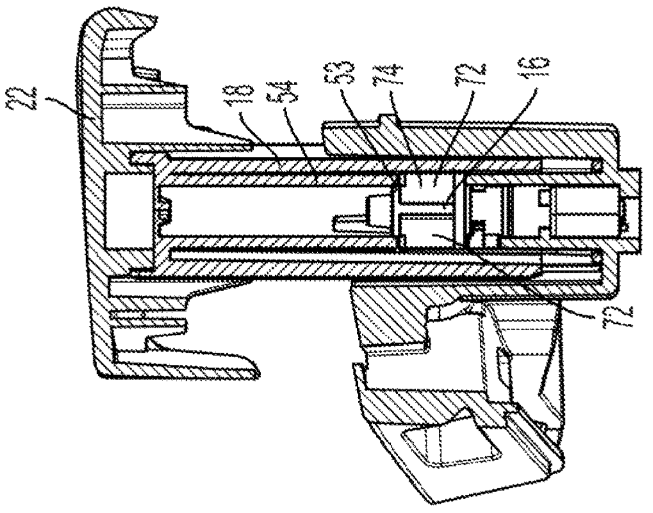

Referring back to FIGS. 1 and 3B, the user-accessible button 22 is mounted to the free end of the plunger 18. A ledge is provided on an interior surface of the button 22 for engaging with the clip 52 of the plunger 18 to retain the button 22 to the plunger 18. The button 22 may be a separate component from the plunger 18, as shown, or, alternatively, the button 22 and the plunger 18 may be integrated together.

The motor 14 is an electric motor, however, the motor 14 may vary from that which is shown and described. The motor 14 may be replaced with a solenoid, for example. The motor 14 may be more generally referred to herein as an actuator.

Referring now to the process of assembling the lock 10, the gear 30 is mounted within a recess of the housing 12. The slide 26 is positioned within the recess 28 of the housing 12 such that the teeth 27 on the slide 26 engage with the teeth on the gear 30.

The button 22 is attached to the end of the plunger 18 by the clip 52. The motor 14 is mounted within the mounting portion 36 of the housing 12. The motor 14 may include wires (not shown) that are connected to a control board (not shown) that controls operation of the motor 14. The control board may comprise a computer processor, a controller, memory and a clock, for example.

Figure 6B:
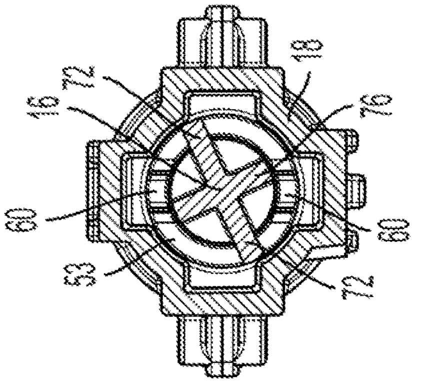
FIG. 6B depicts a cross-sectional view taken through the rotator and the plunger of the lock, in which the rotator is shown in the locked state.
Figure 6D:
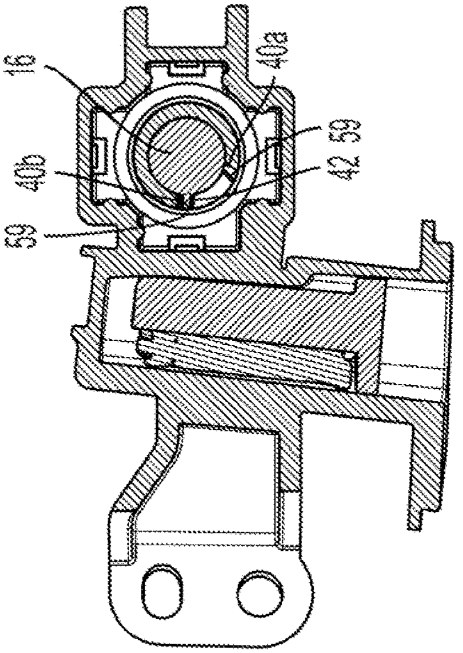
FIG. 6D depicts a cross-sectional view taken through the rotator and the housing of the lock, in which the rotator is shown in an unlocked state.
Figure 6A:
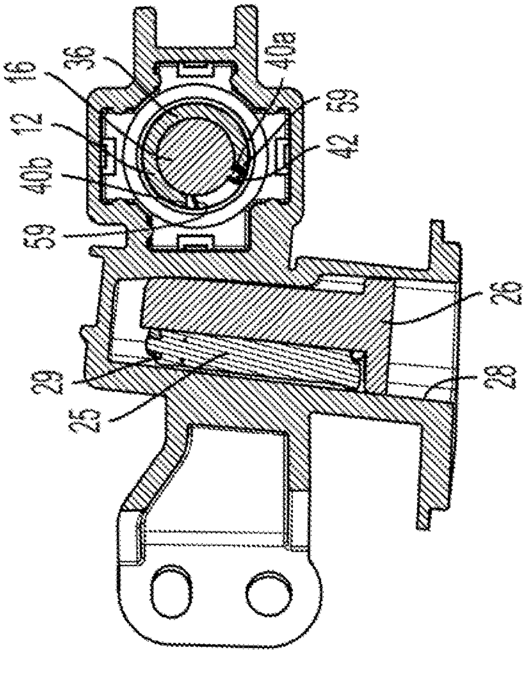
FIG. 6A depicts a cross-sectional view taken through the rotator and the housing of the lock, in which the rotational stop of the rotator is shown in a locked state.
Figure 6C:
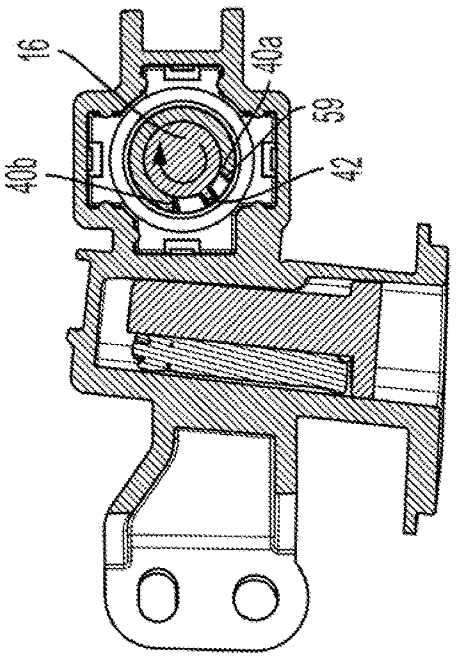
FIG. 6C depicts another cross-sectional view taken through the rotator and the housing of the lock, in which the rotator is shown moving from the locked state of FIG. 6A towards the unlocked state of FIG. 6D.
Figure 6F:
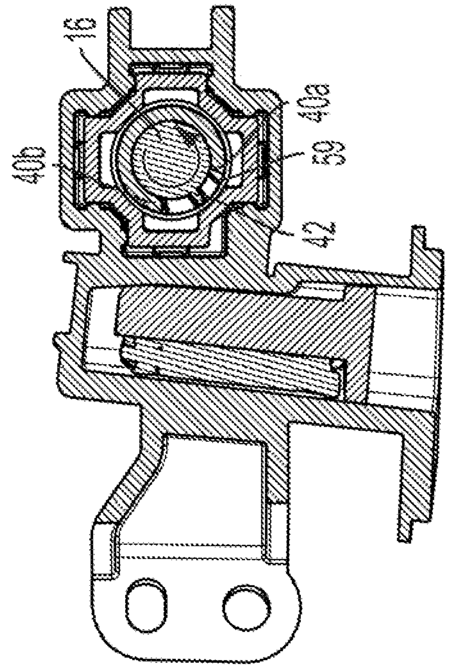
FIG. 6F depicts another cross-sectional view taken through the rotator and the housing of the lock, in which the rotator is shown moving from the unlocked state of FIG. 6D towards the locked state of FIG. 6A.
Figure 6E:
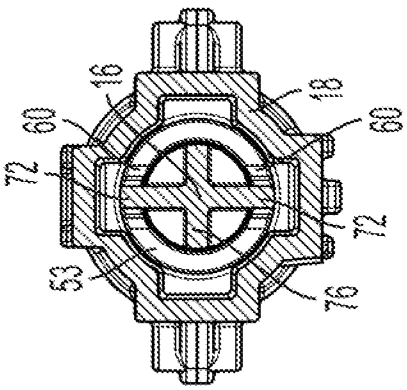
FIG. 6E depicts a cross-sectional view taken through the rotator and the plunger of the lock, in which the rotator is shown in an unlocked state.

The coiled portion 57 of the spring 24 is positioned through the window 66*a* of the rotator 16, and the legs 59 of the spring 24 are positioned through the windows 66*b* and 66*c* such that the legs 59 extend outside of the rotator 16 (as best viewed in FIG. 6A). The lower portion 64 of the rotator 16 is positioned within the mounting portion 36 of the housing 12, and the output shaft 15 of the motor 14 is engaged with the recess 67 at the base of the rotator 16. The rotator 16 is positioned within the mounting portion 36 such that the rotation stop 42 of the rotator 16 and the legs 59 of the spring 24 are positioned within the space defined between the walls 40*a* and 40*b* of the cutout 38 (see FIG. 6A). The legs 59 of the spring 24 will bias the rotator 16 to the partially locked state shown in FIG. 6F.

Figure 3A:
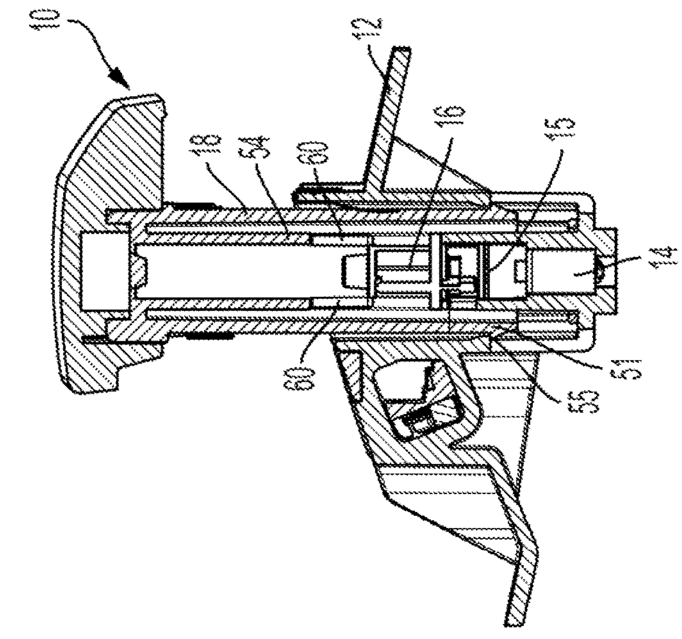
Figure 4C:
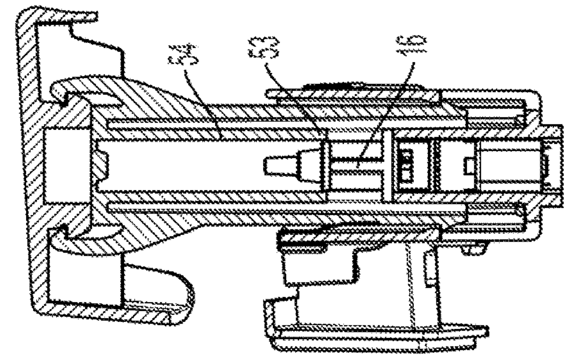
FIGS. 4A-4C depict cross-sectional views of the assembled lock taken from different perspectives, wherein the lock is shown in an unlocked state.
Figure 4B:
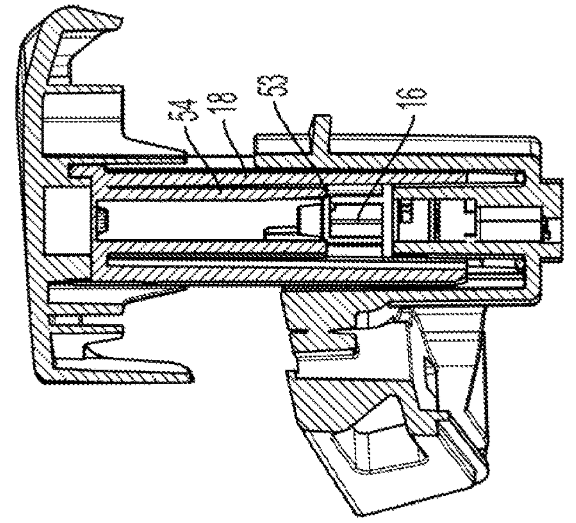
Figure 4A:
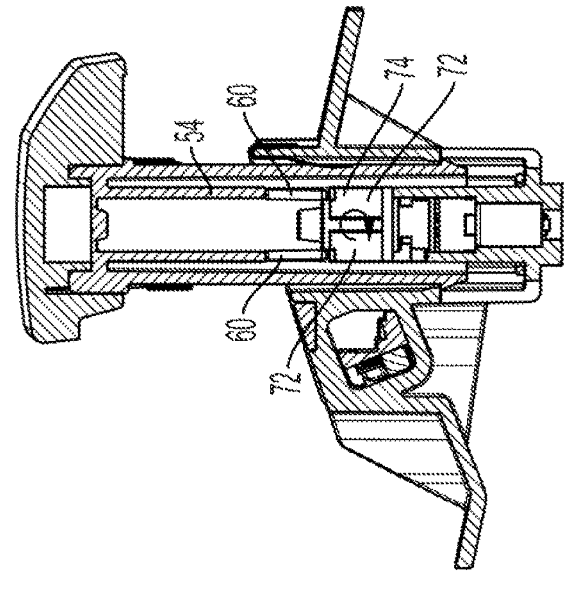

The upper end of the spring 20 is positioned on the spring mount 58 of the plunger 18. The plunger 18 is oriented such that the teeth 50 of the plunger 18 are aligned with (and capable of contacting) the teeth of the gear 30. The lower end of the spring 20 is then placed over the spring mount 82 of the rotator 16. The plunger 18 is then moved downward through the hollow region 34 of the housing 12, thereby compressing the spring 20 between the mounts 58 and 82, until the barbs 51 of the plunger 18 pass over the surface 55 (FIG. 3A) on the housing 12 to prevent detachment of the plunger 18 from the housing 12. The housing 12 may then be attached to a door housing and is ready for use.

It should be understood that the above description of assembling the lock 10 is not limited to any step or sequence of steps, and may vary from that which is shown and described without departing from the scope and spirit of the invention.

Referring now to the process of operating the lock 10, starting from the locked state shown in FIGS. 3A-3C, 6A and 6B, the rotation stop 42 of the rotator 16 is positioned adjacent the wall 40*a* of the housing mounting portion 36, and is held in that location by a gear set attached to the motor 14 or by the motor output directly. The top end 74 of each rib 72 is positioned against the free end 53 of the plunger tube 54. And, the ribs 72 are misaligned with the recesses 60 of the plunger tube 54. One leg 59 of the spring 24 is positioned against the window 66*b* of the rotator 16, the other leg 59 bears on the stationary wall 40*a*, and the coils 57 of the spring 24 are in a state of torsion.

At this stage, if a user were to attempt to depress the button 22, the free end 53 of the plunger 18 would be prevented from moving downward due to the presence of the top end 74 of each rib 72 of the rotator 16. In other words, in the locked state of the lock 10, the button 22 is not capable of being manually depressed by the user. It should be understood that the rotator 16 is mounted to the housing 12 such that the rotator 16 cannot translate downward. Stated differently, the rotator 16 is not capable of translation along axis A, however, the rotator 16 is capable of rotation about axis A.

Turning now to FIGS. 4A-4C and 6C-6E, when it is desired to unlock the lock 10, the user transmits a signal to the motor 14 causing the output shaft 15 to rotate in the unlocking direction (as depicted by the arrows in FIGS. 4A and 6C) by a pre-determined rotational distance. Rotation of the output shaft 15 causes rotation of the rotator 16 by a pre-determined rotational distance to the unlocked state, i.e., to a rotational position where each rib 72 is rotationally aligned with (i.e., registers with) a respective recess 60 of the plunger tube 54.

The signal may be transmitted by a wire or wirelessly by a key fob, a button, a switch, a Bluetooth application on a smart phone, a voice activation system, a retinal scanning system, or a fingerprint scanning system, for example, or any other mechanism that is known to those skilled in the art.

As the rotator 16 rotates toward the unlocked state, the rotation stop 42 of the rotator 16 rotates away from the wall 40*a* and toward the other wall 40*b* of the housing mounting portion 36 against the bias of the spring 24. As the rotator 16 rotates further toward the unlocked state, the spring 24 increases the resistance to rotation of the rotator 16 in the unlocking direction because the spring 24 is in a state of torsion as the legs 59 begin to move toward one another. Specifically, while one leg 59 of the spring 24 rotates along with the window 66*c* of the rotator 16, the other leg 59 bears on the stationary wall 40*b*, thereby rendering the coils 57 of the spring 24 in a state of torsion. The resistance to rotation due to the spring 24 causes the motor 14 to experience a current spike, at which time the control board deactivates the motor 14. The spring 24 slows rotation of the rotator 16.

The rotation stop 42 of the rotator 16 eventually reaches the wall 40*b* of the housing mounting portion 36 and is held in the unlocked position by the motor 14, gearing, or another spring, for example. The wall 40*b* prevents further rotation of the rotator 16 in the unlocking direction. Each rib 72 is now rotationally aligned with (i.e., registers with) a respective recess 60 of the cutout tube 54.

In the process of rotating the rotator 16 from the locked state to the unlocked state, the motor 14 is initially driven at full power for a brief duration of time. The control board monitors the current drawn by the motor 14, and specifically monitors for a current spike that approaches the pre-determined stall current of the motor 14. As explained above, the spring 24 causes the motor 14 to experience the current spike. When the control board detects a current spike, in the form of a current draw that is equal to a pre-determined percentage (e.g., 30%, 80%, 90% or 95%) of the stall current, the control board ceases delivering power to the motor 14 (i.e., deactivates the motor 14). In the event that the control board fails to detect the current spike, the control board is programmed to automatically deactivate the motor 14 using a timeout function to prevent overload of the motor 14. The timeout function may be monitored by the clock of the control board. This process reduces the shock load experienced by a gear box of the motor 14, prolongs the lifespan of the gear box, reduces noise, prevents jamming of the rotation stop 42, and reduces backlash between the motor 14 and the rotator 16.

No sensor or switch is required for monitoring rotation of the rotator 16 or the motor 14, though a sensor or switch may be implemented if desired. For example, the sensor or switch could take the form of a limit switch, an optical reader or a Hall-Effect sensor to sense the state of the motor and control the motor based upon the sensed state.

Figure 5B:
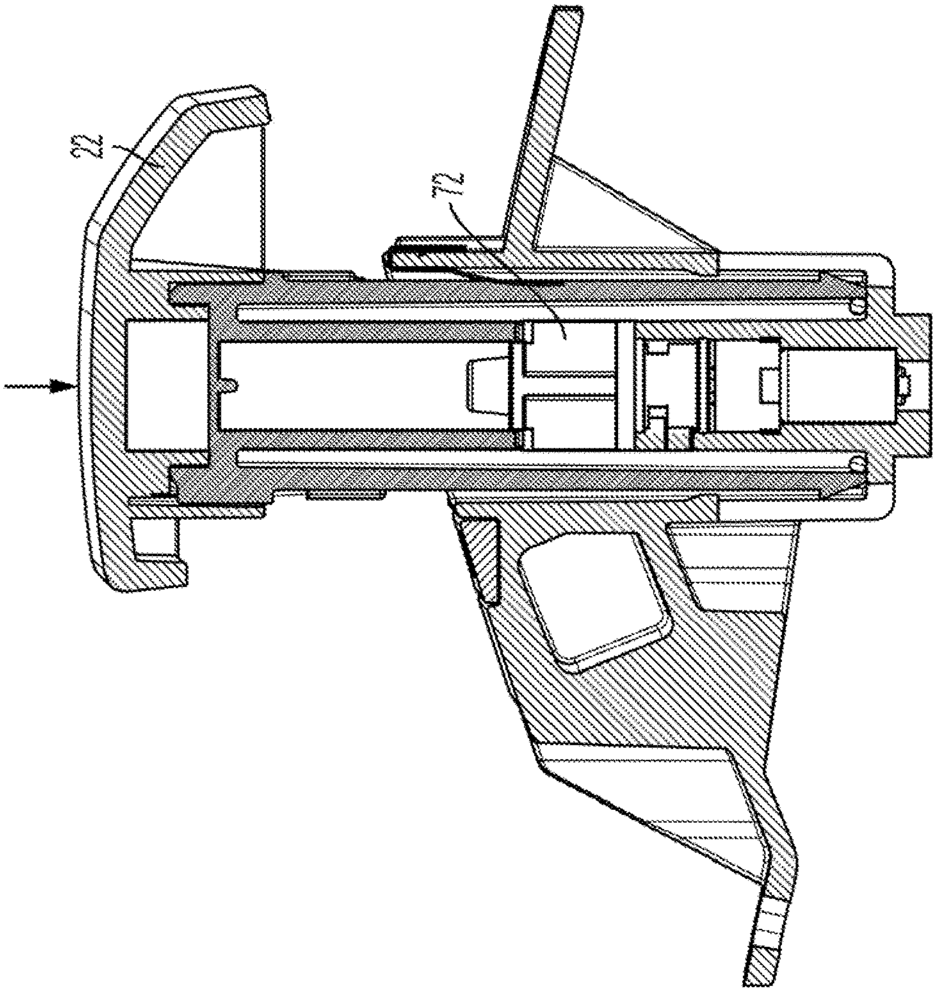
FIGS. 5A and 5B depict cross-sectional views of the assembled and unlocked lock taken from different perspectives, wherein the lock is shown in an unlocked and unlatched state.
Figure 5A:
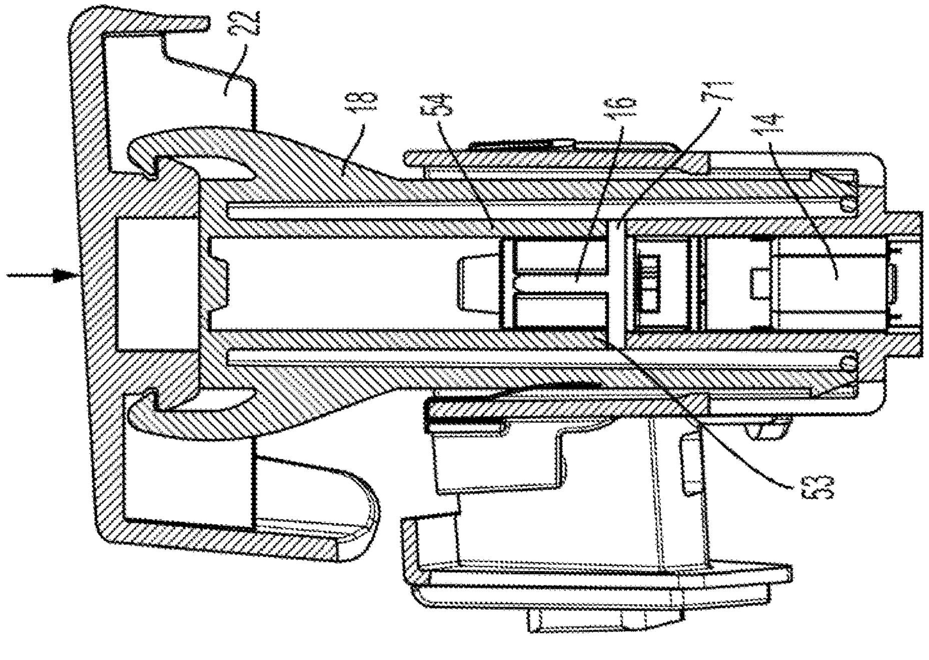

Turning now to FIGS. 5A and 5B, once the lock 10 is moved to the unlocked state described above, it is possible for a user to unlatch the lock 10 and open the door. To unlatch the lock 10, a user manually depresses (see arrows in FIGS. 5A and 5B) the button 22 against the bias of the spring 20, thereby compressing the spring 20. Unlike the locked state of the lock 10, in the unlocked state it is possible to depress the button 22 and plunger 18 because the recesses 60 in the plunger 18 can travel over the ribs 72 of the rotator 16. Upon depressing the button 22 and plunger 18, the teeth 50 on the plunger 18 rotate the gear 30, and rotation of the gear 30 causes outward translation/extension of the slide 26, which is also meshed with the gear 30. Outward extension of the slide 26 causes the door to become unlatched from the door housing. When the user eventually releases the button 22, the spring 20 expands and causes the plunger 18 and the button 22 to move upwardly and return to the position shown in FIG. 4A.

Although not shown, the slide 26 interacts with a pawl of a latching system that is located within the glove box door, such as the latching system disclosed in U.S. Pat. No. 10,081,970, which is incorporated by reference in its entirety. Specifically, in operation, the slide 26 extends from the housing 12 to push a pawl out of a striker on the door housing, which causes the door to become unlatched from the door housing.

Turning now to FIGS. 3A, 3B, 6A and 6F, when it is desired to re-lock the lock 10, the user transmits a signal to the motor 14 causing the output shaft 15 to rotate in the locking direction (as depicted by the arrows in FIG. 6F) by a pre-determined rotational distance. Alternatively, the lock 10 may automatically re-lock after a pre-determined period of time has elapsed. It should be understood that the locking direction and the unlocking direction are opposite rotational directions. Rotation of the output shaft 15 causes rotation of the rotator 16 by a pre-determined rotational distance to the locked state, i.e., to a rotational position where each rib 72 is rotationally misaligned with a respective recess 60 of the plunger tube 54, thereby preventing the button 22 from being depressed by a user. The spring 24, which is preloaded starting from the unlocked state, helps start the next cycle of the motor 14.

As the rotator 16 rotates toward the locked state, the rotation stop 42 of the rotator 16 rotates away from the wall 40*b* and toward the other wall 40*a* of the housing mounting portion 36 against the bias of the spring 24. As the rotator 16 rotates further toward the locked state, the spring 24 increases the resistance to rotation of the rotator 16 in the locking direction because the spring 24 is in torsion as the legs 59 begin to move toward one another. Specifically, while one leg 59 of the spring 24 rotates along with the window 66*b* of the rotator 66, the other leg 59 is pressed against the stationary wall 40*a*, thereby rendering the coils 57 of the spring 24 in a state of torsion. The spring 24 slows rotation of the rotator 16. The rotation stop 42 of the rotator 16 eventually reaches the wall 40*a* of the housing mounting portion 36, contacting the wall 40*a* at a reduced speed, and is held in the locked position by the motor 14, gearing, or another spring, for example. The wall 40*a* prevents further rotation of the rotator 16 in the locking direction.

As was described for the unlocking mode, in the course of locking the lock 10, the resistance to rotation due to the spring 24 causes the motor 14 to experience a current spike, at which time the control board deactivates the motor 14. The rotation stop 42 eventually contacts the wall 40*a* of the housing mounting portion 36, which prevents further rotation of the rotator 16 in the locking direction. In the process of rotating the rotator 16 from the unlocked state to the locked state, the motor 14 is initially driven at full power for a brief duration of time. The control board monitors the current drawn by the motor 14, and specifically monitors for a current spike that approaches the pre-determined stall current of the motor 14. As explained above, the spring 24 causes the motor 14 to experience the current spike. When the control board detects a current spike, in the form of a current draw that is equal to a pre-determined percentage (e.g., 30%, 80%, 90% or 95%) of the stall current (e.g., 450 mA), the control board ceases delivering power to the motor 14 (i.e., deactivates the motor 14). In the event that the control board fails to detect the current spike, the control board is programmed to automatically deactivate the motor 14 using a timeout function to prevent overload of the motor 14. The timeout function may be monitored by the clock of the control board. As was described above, this above process reduces the shock load experienced by a gear box of the motor 14, prevents jamming, prolongs the lifespan of the gear box, reduces noise, and reduces backlash between the motor 14 and the rotator 16 in both drive directions.

The spring 24 confers several commercial advantages over electric latches without springs. In addition to the benefits described above, the spring 24 reduces the momentum of the rotator 16 before it contacts one of the walls 40*a*/40*b* and the resulting shock experienced by the gear box of the motor 14 upon contact between the rotator 16 and one of the walls 40*a*/40*b*. In the absence of the spring 24, the rotation stop 42 of the rotator 16 would directly contact one of the walls 40*a*/40*b* of the housing mounting portion 36 without gradually slowing prior to contact. This could result in a shock load experienced by a gear box of the motor 14, shortened lifespan of the gear box, increased noise, and increased backlash between the motor 14 and the rotator 16. The spring 24 also does not require a significant amount of room and fits within the same packaging space as compared to similar mechanical locking systems.

The spring 24 is not limited to the torsion spring that is shown and described herein. The spring 24 may be integrated with the walls 40*a*/40*b* of the mounting portion 36, or the spring 24 may be integrated with the rotator 16.

Turning now to FIGS. 11A-14, the lock 10 includes an inertial locking system to prevent the lock 10 from inadvertently moving from the latched state to the unlatched state during an impact (i.e., crash) of the vehicle, i.e., thereby preventing the glove box from inadvertently opening during the impact. The inertial locking system is particularly configured to prevent the lock 10 from inadvertently moving from the latched state to the unlatched state in the event of a frontal impact of a vehicle to which the lock 10 is attached.

The inertial locking system comprises an inertial lock body 25, a torsion spring 29, the slide 26, and an opening 96 formed in the housing 12. More particularly, the inertial lock body 25 includes a first end 90 that is rotatably connected to the slide 26. Specifically, a projection 91 of the slide 26 extends through an opening 93 formed in the lock body 25. Other means for rotatably connecting the lock body 25 and the slide 26 are envisioned. A second end 92 of the lock body 25, which is opposite the first end 90, includes a downwardly-extending projection 94 that selectively engages with the opening 96 in the housing 12.

Figure 11B:
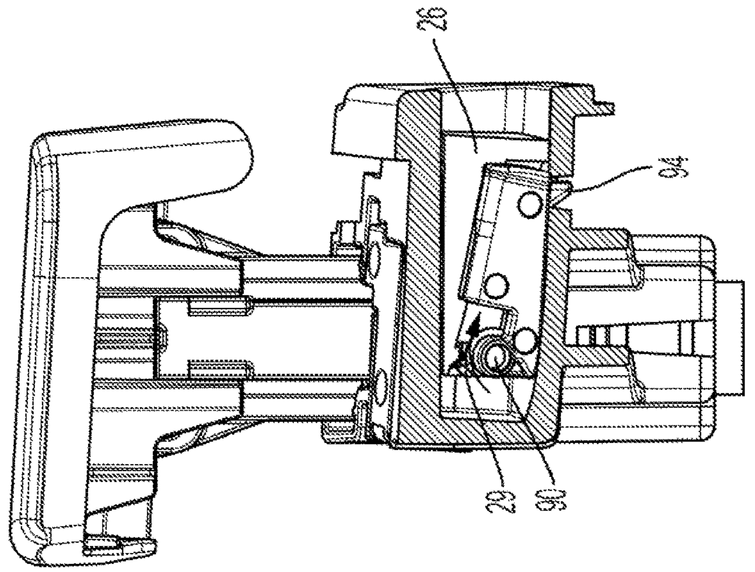
FIG. 11B depicts a cross-sectional view of the assembled lock of FIG. 11A showing the inertial lock bar pivoted to a locked position.
Figure 11A:
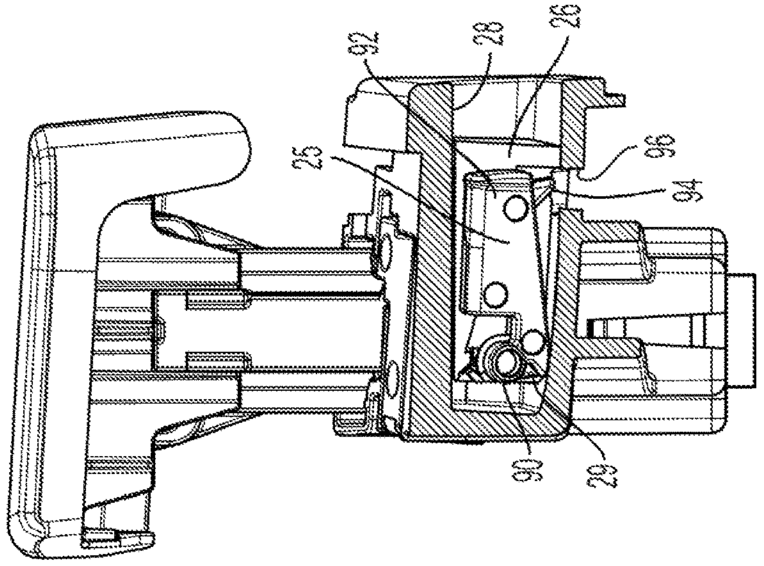
FIG. 11A depicts a cross-sectional view of the assembled lock showing an inertial lock bar pivoted to an unlocked position.

In the unlocked state of the lock body 25 shown in FIG. 11A, the projection 94 is separated from the opening 96. And, in the locked state of the lock body 25 shown in FIG. 11B, the projection 94 is engaged with the opening 96. The torsion spring 29 is connected to the first end 90 for biasing the lock body 25 to the unlocked position of FIG. 11A. One C-shaped leg 29*a* of the coiled torsion spring 29 bears on a seat 94 disposed on the lock body 25, and the other straight leg 29*b* of the torsion spring bears on a seat 95 formed between two projections on the slide 26.

In the event of an impact of the vehicle, the inertial force resulting from the impact causes the lock body 25 to rotate under its own weight against the bias of the spring 29 in the directions indicated by the arrows in FIG. 11B. As the lock body 25 rotates downward, the projection 94 moves within the opening 96, thereby preventing the slide 26, which is connected to the lock body 25, from moving outward to inadvertently open the glove box door under the inertial force. The spring 29 will return the lock body 25 to the unlocked position of FIG. 11A in the absence of the inertial force.

It should be understood that the above description of operating the lock 10 is not limited to any step or sequence of steps, and may vary from that which is shown and described without departing from the scope and spirit of the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An electronic lock for securing a door or access panel, the electronic lock comprising:

a housing;

a plunger that is mounted for movement relative to the housing, wherein the plunger is movable between a first position corresponding to a latched state of the electronic lock and a second position corresponding to an unlatched state of the electronic lock;

a rotator that is coupled to the plunger and mounted for rotation relative to the housing between a first rotational position and a second rotational position, wherein in the first rotational position of the rotator corresponding to a locked state of the electronic lock, the plunger is prevented from moving from the first position to the second position, and, in the second rotational position of the rotator corresponding to an unlocked state of the electronic lock, the plunger is permitted to move from the first position to the second position for unlatching the door or access panel;

a motor having an output shaft that is mounted in the housing and configured to rotate the rotator between the first rotational position and the second rotational position;

a spring that is directly or indirectly coupled to the shaft of the motor and configured to resist the movement of the output shaft and the rotator between the first rotational position and the second rotational position;

wherein the spring is positioned to bear on the rotator and the housing to resist the rotation of the output shaft as the output shaft moves the rotator (i) from the first rotational position of the rotator corresponding to the locked state of the electronic lock toward the second rotational position of the rotator corresponding to the unlocked state of the electronic lock, and (ii) from the second rotational position of the rotator corresponding to the unlocked state of the electronic lock toward the first rotational position of the rotator corresponding to the locked state of the electronic lock; and wherein the rotator includes a rotation stop that is configured to rotate between two stop surfaces disposed on the housing, wherein one of the two stop surfaces corresponds to the locked state and the other of the two stop surfaces corresponds to the unlocked state of the electronic lock.

2. The electronic lock of claim 1, further comprising a slide that is mounted for movement relative to the housing and coupled to the plunger such that movement of the plunger from the first position to the second position causes movement of the slide between latched and unlatched positions.

3. The electronic lock of claim 1 further comprising a user-operated button coupled to the plunger.

4. A vehicle glove box assembly comprising the electronic lock of claim 1.

5. A vehicle center console assembly comprising the electronic lock of claim 1.

6. A vehicle compartment assembly comprising the electronic lock of claim 1.

7. The electronic lock of claim 1, further comprising a controller that is coupled to the motor and configured to deactivate the motor when a current drawn by the motor reaches a pre-determined percentage of a stall current of the motor.

8. The electronic lock of claim 1, wherein the spring is a torsion spring.

9. The electronic lock of claim 8, wherein the torsion spring has a coiled portion and two legs, wherein the coiled portion is coupled to the rotator, one of the two legs is positioned between the rotator and a first stop surface disposed on the housing, and one of the two legs is positioned between the rotator and a second stop surface disposed on the housing.

10. The electronic lock of claim 1, wherein the output shaft is non-rotatably connected to the rotator.

11. The electronic lock of claim 1, wherein when the rotator moves from the first rotational position to the second rotational position, the rotation stop rotates away from a first stop surface, toward a second stop surface, and against the spring resisting movement of the output shaft.

12. The electronic lock of claim 11, wherein when the rotator moves from the second rotational position to the first rotational position, the rotation stop rotates away from the second stop surface, toward the first stop surface, and against the spring resisting movement of the output shaft.

13. An electronic lock for securing a door or access panel, the electronic lock comprising:

a housing;

a plunger that is mounted for movement relative to the housing, wherein the plunger is movable between a first position corresponding to a latched state of the electronic lock and a second position corresponding to an unlatched state of the electronic lock;

a rotator that is coupled to the plunger and mounted for rotation relative to the housing between a first rotational position and a second rotational position, wherein in the first rotational position of the rotator corresponding to a locked state of the electronic lock, the plunger is prevented from moving from the first position to the second position, and, in the second rotational position of the rotator corresponding to an unlocked state of the electronic lock, the plunger is permitted to move from the first position to the second position for unlatching the door or access panel;

a motor having an output shaft that is mounted in the housing and configured to rotate the rotator between the first rotational position and the second rotational position;

a spring that is directly or indirectly coupled to the shaft of the motor and configured to resist the movement of the output shaft and the rotator between the first rotational position and the second rotational position;

wherein the spring is positioned to bear on the rotator and the housing to resist the rotation of the output shaft as the output shaft moves the rotator (i) from the first rotational position of the rotator corresponding to the locked state of the electronic lock toward the second rotational position of the rotator corresponding to the unlocked state of the electronic lock, and (ii) from the second rotational position of the rotator corresponding to the unlocked state of the electronic lock toward the first rotational position of the rotator corresponding to the locked state of the electronic lock; and wherein the rotator includes one of a projection and a recess and the plunger includes the other of the projection and the recess, and wherein, in the second rotational position of the rotator corresponding to the unlocked state of the electronic lock, the projection is aligned and registers with the recess such that the plunger is permitted to move from the first position to the second position for unlatching the door or access panel.

14. The electronic lock of claim 13, wherein in the first rotational position of the rotator corresponding to the locked state of the electronic lock, the projection is misaligned with the recess such that the plunger is prevented from moving from the first position to the second position for unlatching the door or access panel.

15. A door or access panel assembly comprising:

a door or access panel;

an electronic lock associated with the door or access panel, the electronic lock having a housing;

a plunger that is mounted for movement relative to the housing, wherein the plunger is movable between a first position corresponding to a latched state of the electronic lock and a second position corresponding to an unlatched state of the electronic lock;

a rotator that is coupled to the plunger and mounted for rotation relative to the housing between a first rotational position and a second rotational position, wherein in the first rotational position of the rotator corresponding to a locked state of the electronic lock, the plunger is prevented from moving from the first position to the second position, and, in the second rotational position of the rotator corresponding to an unlocked state of the electronic lock, the plunger is permitted to move from the first position to the second position for unlatching the door or access panel, wherein the rotator includes a rotation stop that is configured to rotate between two stop surfaces disposed on the housing, wherein one of the two stop surfaces corresponds to the locked state and the other of the two stop surfaces corresponds to the unlocked state of the electronic lock;

a motor having an output shaft that is mounted in the housing and configured to rotate the rotator between the first rotational position and the second rotational position; and a spring that is directly or indirectly coupled to the shaft of the motor and configured to resist the movement of the output shaft and the rotator between the first rotational position and the second rotational position, wherein the spring is positioned to bear on the rotator and the housing to resist the movement of the output shaft as the output shaft moves the rotator (i) from the first rotational position of the rotator corresponding to the locked state of the electronic lock toward the second rotational position of the rotator corresponding to the unlocked state of the electronic lock, and (ii) from the second rotational position of the rotator corresponding to the unlocked state of the electronic lock toward the first rotational position of the rotator corresponding to the locked state of the electronic lock;

wherein movement of the door or access panel is prevented when the plunger is in the first position corresponding to the latched state of the electronic lock and the rotator is in the first rotational position corresponding to the locked state of the electronic lock.

* * * * *